Patented Feb. 25, 1936

2,031,619

UNITED STATES PATENT OFFICE 2,031,619

CELLULOSE DERIVATIVE SOLVENTS

George W. Seymour, Cumberland, Md., assignor to Celanese Corporation of America, a corporation of Delaware No Drawing. Original application November 13, 1931, Serial No. 574,928. Divided and this application November 15, 1932, Serial No. 642,761

3 Claims. (Cl. 260—54)

This invention relates to a solvent for cellulose acetate and other derivatives of cellulose and relates to methods and compositions wherein such solvent is employed.

This application is a division of my application S. No. 574,928 filed Nov. 13, 1931.

An object of my invention is to produce a new solvent for cellulose acetate or other organic derivatives of cellulose. Other objects of my invention will appear from the following detailed description.

As is well known, the number of substances that are solvents for cellulose acetate, especially the acetone-soluble type of cellulose acetate, is very limited. Because of the small range of these solvents, it is often difficult and even impossible to find a solvent that meets with the particular requirements of a given problem, such as boiling point, compatibility or mutual solubility with other solvents, resins or other ingredients present in the cellulose acetate composition in which it is employed, cheapness, availability, etc. This is particularly true in the case of high or medium boiling solvents for cellulose acetate.

I have found that the condensation products of propylene glycol or diethylene glycol with formaldehyde, acetaldehyde, benzaldehyde or other aldehydes, such as formal-propylene glycol or formal diethylene glycol, are excellent solvents for cellulose acetate particularly the acetone soluble cellulose acetate and other organic derivatives of cellulose and may be employed in all compositions or processes wherein cellulose acetate is to be dissolved.

These products may be formed by the condensation of formaldehyde, formalin, paraformaldehyde, trihydroxymethylene, acetaldehyde, benzaldehyde or other aldehydes in the presence of an acid such as hydrochloric acid or phosphoric acid with a polyhydric alcohol selected from the group consisting of propylene glycol and diethylene glycol.

Formal-propylene glycol, or the methylene ether of propylene glycol, having the structural formula

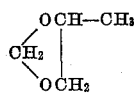

is a new compound. It may be made by refluxing 154 grams of propylene glycol with 60 grams of paraformaldehyde and 10 cc. of concentrated hydrochloric acid for 18 to 20 hours and separating out by fractional distillation the fraction boiling at 82° to 87° C. It is an excellent solvent for cellulose acetate or other organic derivatives of cellulose.

Formal-diethylene glycol, or the methylene ether of diethylene glycol, having the probable structural formula of

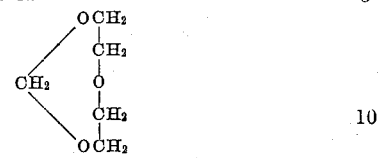

is a new compound and may be formed by refluxing for 18 hours, 106 grams of diethylene glycol with 30 grams of paraformaldehyde in the presence of 5 cc. of concentrated HCl. The resulting material is fractionally distilled and the fraction boiling between 180 to 240° C. is separated. This is an excellent solvent for cellulose acetate and other derivatives of cellulose.

As stated the condensation product of the aldehyde with the propylene glycol or diethylene glycol may be used wherever it is desired to dissolve partially or wholly derivatives of cellulose, such as cellulose nitrate but particularly the organic derivatives of cellulose such as organic esters of cellulose and cellulose ethers. Examples of organic esters of cellulose being cellulose acetate, cellulose formate, cellulose butyrate, while examples of cellulose ethers are ethyl cellulose, methyl cellulose and benzyl cellulose.

A few of the many instances of the use of these formals or condensation products of an aldehyde with the polyhydric alcohols will be given.

These condensation products may be employed alone or in conjunction with low boiling, medium, or high boiling solvents, resins both natural and synthetic, plasticizers or other desired ingredients to prepare coating compositions or dopes containing cellulose acetate or other organic derivatives of cellulose, which coating compositions may be employed for coating fabrics, wood and the like, or as lacquers containing suitable natural or synthetic resins, to be applied to metallic or other smooth surfaces. Dopes containing the cellulose acetate dissolved in a solvent comprising these condensation products of the polyhydric alcohol with an aldehyde may be cast on to smooth surfaces such as film bands, wheels and the like, to form upon evaporation of the solvent, films which may be used for photographic purposes, or thin foils to be employed as transparent wrappings for packages of foodstuffs, tobacco products and other articles of commerce.

Plastic compositions containing organic derivatives of cellulose, plasticizers and other desired ingredients may be made by the use of the polyhydric alcohol-aldehyde condensation product as at least part of the solvent during the kneading of the mass and subsequent working up of the same on heated malaxating rolls.

If desired besides the polyhydric alcohol-aldehyde condensation product other solvents may be used in addition thereto, such as low boiling solvents like acetone, ethylene dichloride and the like, and medium and/or high boiling solvents such as ethyl acetate, ethyl lactate, tetrachlorethane or diacetone alcohol. Examples of plasticizers for cellulose acetate are diphenylol propane, triacetin, dibutyl tartrate, diethyl phthalate, monomethylene xylene sulfonamid, triphenyl phosphate, etc.

It is to be understood that the foregoing description is given merely by way of illustration and that many variations may be made therein without departing from the spirit of my invention.

Having described my invention, what I desire to secure by Letters Patent is:

1. Process for the manufacture of cyclic triethers, which comprises reacting a saturated aldehyde with diethylene glycol in the presence of an amount of a concentrated solution of hydrochloric acid equal to 5% calculated on the weight of the glycol.

2. Process for the manufacture of formal diethylene glycol, which comprises reacting formaldehyde with diethylene glycol in the presence of an amount of a concentrated solution of hydrochloric acid equal to 5% calculated on the weight of the glycol.

3. Formal-diethylene glycol.

GEORGE W. SEYMOUR.